March 3, 1959 J. C. SKINNER ET AL 2,876,306
INDICATOR
Filed Aug. 16, 1957 2 Sheets-Sheet 1

INVENTORS.
Jack C. Skinner
and Sam H. Tucker, Jr.
BY
Patrick D. Beavers
ATTORNEY.

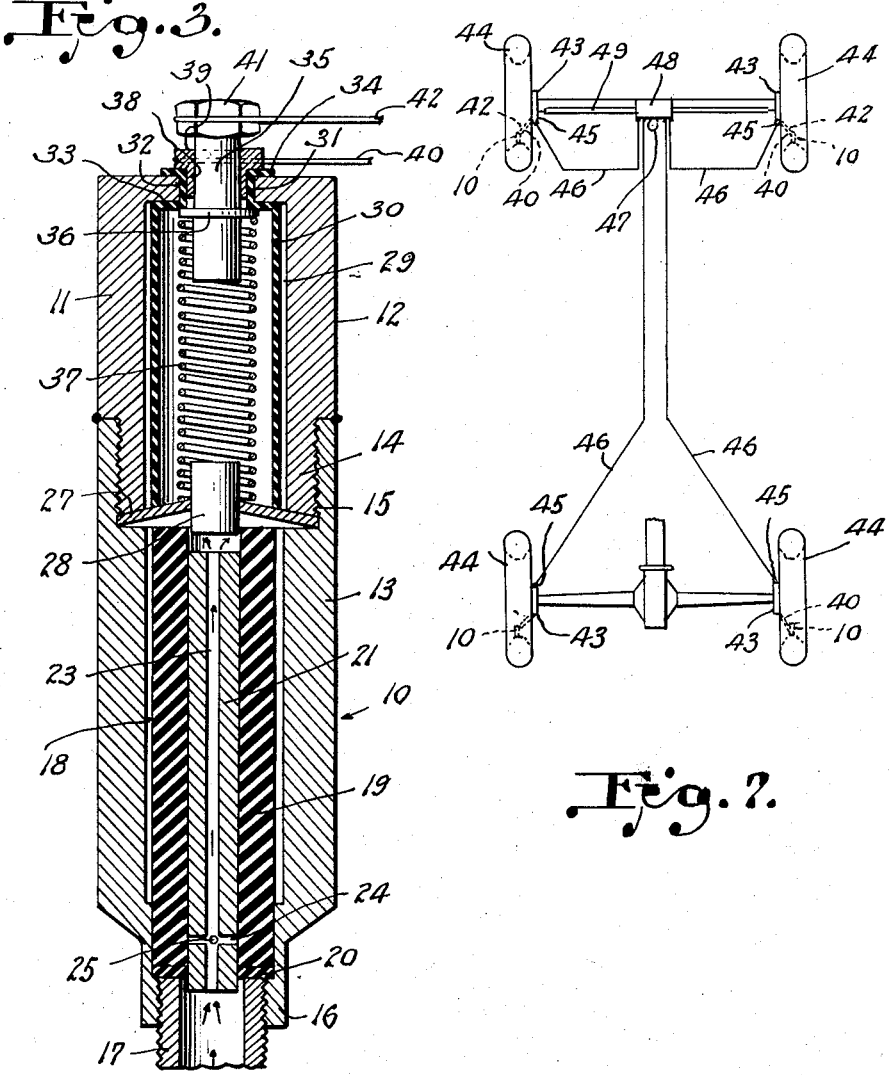
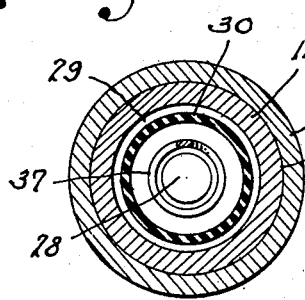
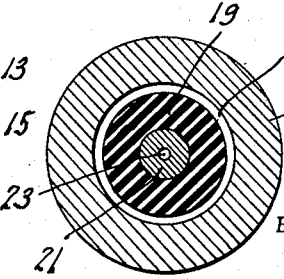

United States Patent Office 2,876,306
Patented Mar. 3, 1959

2,876,306
INDICATOR

Jack C. Skinner and Sam H. Tucker, Jr., Lawton, Okla.

Application August 16, 1957, Serial No. 678,690

5 Claims. (Cl. 200—61.25)

This invention relates to improvements in indicators that provide a warning for the operator of a motor vehicle when one or more of the tires is under-inflated.

An object of this invention is to provide an indicator having a warning signal on the dash that is adapted to flash when a tire becomes deflated.

Another object of this invention is to provide a separate indicator for each tire so that the inflated or deflated condition of each tire is clearly apparent to the operator of the motor vehicle.

A further object of the invention is to provide an indicator of this type that is simple to install without alteration of the existing stem and valve assembly in use on the conventional inner tube.

With the above and other objects and advantages in view, the invention consists of the novel details of construction, arrangement and combination of parts more fully hereinafter described, claimed and illustrated in the accompanying drawings, in which:

Fig. 3 is a view similar to Fig. 2 with the contacts separated;

Fig. 5 is a transverse sectional view on the line 5—5 of Fig. 2;

Fig. 6 is a transverse sectional view on the line 6—6 of Fig. 2; and

Fig. 7 is a diagrammatic view of the circuit for the indicator.

Figure 1:
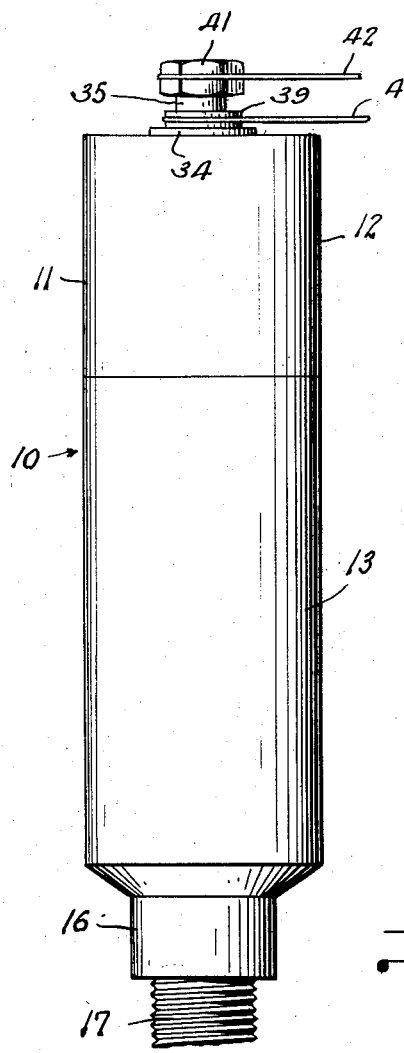
Fig. 1 is an elevational view on an indicator embodying the invention.
Figure 2:
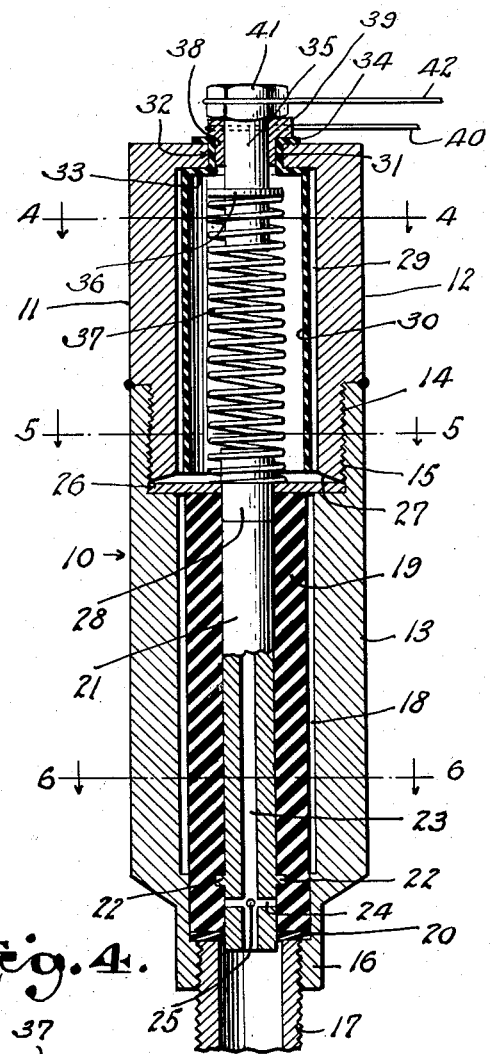
Fig. 2 is a vertical sectional view of the indicator of Fig. 1, showing the contacts in engagement with each other.
Figure 4:
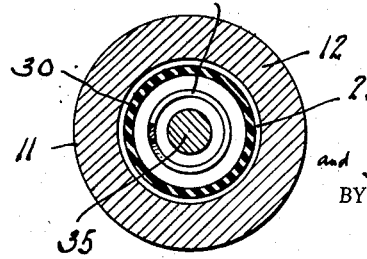
Fig. 4 is a transverse sectional view on the line 4—4 of Fig. 2.

Referring more in detail to the drawings, wherein like parts are designated by like reference numerals, the reference numeral 10 is used to generally designate an indicator embodying the invention.

The indicator 10 comprises a tubular housing 11 having an upper portion 12 and a lower portion 13.

The upper portion 12 has a reduced externally threaded portion 14 that is threadably secured in an internally threaded socket 15 in one end of the lower portion 13.

The opposite end of the lower portion 13 is provided with a reduced internally threaded socket 16 that is threaded onto a conventional valve stem 17.

The portion 13 has a cylindrical chamber 18 therein in which is mounted a tubular insulated member 19. A gasket 20 of insulating material is positioned in the socket 16 and is engaged on opposite sides by one end of the member 19 and the end of the valve stem 17.

A metal rod 21 is positioned in the member 19 and oppositely disposed projections 22 enter the member 19 to retain the rod 21 in the member 19. An air passage 23 extends longitudinally of the rod 21 and transversely extending radially disposed passageways 24 and 25 extend in crossed relation to each other in communication with each other and with the passage 23.

A diaphragm 26 is positioned in the socket 15 in the lower member 13 and the end of the reduced portion 14 is bevelled as at 27 to permit flexing of the diaphragm 26, as shown in Fig. 3.

The diaphragm 26 carries a metal plug 28 that is positioned in the member 19 so that it will contact one end of the rod 21.

The upper portion 12 of the housing 11 has a chamber 29 therein in which is positioned a tubular insulated sleeve 30. The sleeve 30 has a neck portion 31 that is positioned in an opening 32 in the end of the upper portion 12. The sleeve 30 has an annular shoulder 33 that abuts the inner surface of the end of the upper portion 12, having the opening 32 therein. The free end of the sleeve 30 has an annular flange 34 that is in circumjacent relation to the opening 32 and is in contact with the outer surface of the end of the portion 12.

A metal plug 35 is positioned in the neck 31 of the sleeve 30 and the plug 35 is provided with an annular collar 36. A spring 37 is positioned in the chamber 29 within the sleeve 30 with one end in circumjacent relation with the plug 28 and with the opposite end in circumjacent relation with the plug 35 and in abutting relation with the collar 36.

A sleeve 38 is mounted in the neck 31 of the sleeve 30 in circumjacent relation to the plug 35 and in sliding relation therewith and the sleeve 38 has an annular flange 39 on the outer end thereof which is in engagement with the annular flange 34 on the neck 32 of the sleeve 30 and a lead wire 40 is connected to the flange 39. The plug 35 has a hex shaped head 41 thereon to which is connected a lead wire 42.

In Fig. 7 the circuit for the indicator 10 is shown and in the hookup the lead wires 40 are each grounded to the brake drum 43 of each of the vehicle wheels 44. Each of the lead wires 42 engage a brush member 45 on the backing plate of each of the brake drums 43 and lead wires 46 are connected at one end to each of the brush members 45 and at the opposite end to a flasher bulb 47 that is mounted in a box 48 mounted on the instrument panel 49 of the motor vehicle.

Thus, as each tire becomes deflated, the flasher bulb 47, connected to the valve stem thereof, will be energized to indicate which tire needs air as each tire has its own flasher bulb 47 and an individual circuit to each bulb.

In operation, the spring 37 is tensioned so that when the air pressure in the tire is over the prescribed limit the spring will be expanded as in Fig. 3. The air from the tire leaving the stem 17 and passing upwardly through the passage 23 to urge the plug 28 away from the rod 21. However, when the air pressure in the tire falls below the prescribed pressure, the spring 37 will expand, letting the plug 28 engage the rod 21.

The pressure in the tire acts on the diaphragm 26 to urge the plug 28 upwardly and as the spring pressure increases on the collar 36, it will move the head 41 out of engagement with the flange 39 on the sleeve 38. At this time there is no contact between the head 41 and flange 39, however, as the pressure in the tire falls the pressure of the spring pushes the diaphragm 26 downwardly so that the head 41 comes into contact with the flange 39. Since the lead wires 40 are grounded and the lead wires 42 are in circuit with the lead wires 46, which are connected to the box 48 which is in turn connected to the battery of the motor vehicle, the flasher bulbs 47 will be energized to indicate the air pressure in the tire is low.

When the applicator 10 is mounted on the stem 17, the rod 21 will engage and depress the tire valve in the stem 17 so that the pressure will escape from the tire to pass upwardly into the housing 11 as previously described.

It is believed that from the foregoing description the structure of the invention will be apparent to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. An indicator for automobile tires comprising a housing that is in threaded engagement with the valve stem of a tire, a diaphragm in said housing extending transversely thereof, a spring in said housing engaging said diaphragm at one end, a first plug in said housing engaging the opposite end of said spring, a first sleeve in said housing circumjacent to said plug, a head on said plug, a flange on said sleeve, a lead wire connected to said head, a lead wire connected to said flange and said spring urging said head out of engagement with said flange when the pressure in said tire is correct and permitting said head to engage said flange when the pressure is low to complete a circuit to energize a signal.

2. An indicator as in claim 1, wherein said housing comprises a lower section and an upper section and said sections are threadably connected to each other and said diaphragm is positioned between the ends of said sections.

3. An indicator as in claim 1, wherein a second sleeve of insulating material is positioned in said housing and said second sleeve has a neck portion positioned between said first sleeve and said housing to insulate said first sleeve from said housing.

4. An indicator as in claim 1, wherein a tubular member of insulating material is positioned in said housing, a rod having passages therein is positioned in said tubular member and said diaphragm is provided with a second plug that is adapted to engage the end of said rod to close the passages in said rod.

5. An indicator as in claim 1, wherein said first plug is provided with an annular collar which is in engagement with the opposite end of said spring.

References Cited in the file of this patent

UNITED STATES PATENTS

| | | |
|---|---|---|
| 2,574,791 | Kroll | Nov. 13, 1951 |
| 2,727,221 | Sprigg | Dec. 13, 1955 |